(12) United States Patent
Fukuoka et al.

(10) Patent No.: US 7,688,416 B2
(45) Date of Patent: Mar. 30, 2010

(54) LIQUID CRYSTAL DISPLAY DEVICE

(75) Inventors: Nobuko Fukuoka, Saitama (JP);
Masanori Imakawa, Fukaya (JP);
Arihiro Takeda, Saitama (JP);
Hirokazu Morimoto, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 12/102,286

(22) Filed: Apr. 14, 2008

(65) Prior Publication Data
US 2008/0291382 A1    Nov. 27, 2008

(30) Foreign Application Priority Data
May 23, 2007    (JP) .............. P2007-136812

(51) Int. Cl.
G02F 1/1339    (2006.01)
(52) U.S. Cl. .................. 349/153; 349/155; 349/156
(58) Field of Classification Search .......... 349/153, 349/155, 156
See application file for complete search history.

(56) References Cited

U.S. PATENT DOCUMENTS

| 5,263,888 | A  | 11/1993 | Ishihara et al. |
| 6,181,406 | B1 | 1/2001  | Morimoto et al. |
| 6,377,328 | B1 | 4/2002  | Morimoto et al. |
| 6,683,671 | B1 | 1/2004  | Morimoto |
| 6,741,318 | B2 | 5/2004  | Morimoto |
| 6,888,609 | B2 | 5/2005  | Iizuka et al. |
| 2005/0117106 | A1* | 6/2005 | Tatemura et al. ............ 349/153 |
| 2005/0280757 | A1 | 12/2005 | Yamada et al. |
| 2007/0076160 | A1* | 4/2007 | Shiiba et al. ................ 349/153 |

FOREIGN PATENT DOCUMENTS

| JP | 5-232481    | 9/1993 |
| JP | 3388463     | 1/2003 |
| JP | 2008-058375 | 3/2008 |

\* cited by examiner

*Primary Examiner*—David Nelms
*Assistant Examiner*—David Y Chung
(74) *Attorney, Agent, or Firm*—Oblon, Spivak, McClelland, Maier & Neustadt, L.L.P.

(57) ABSTRACT

Structural objects are disposed in a peripheral region in positions opposed to spacers. In this way, a substrate surface of a counter substrate in the peripheral region is gently inclined in a direction away from a liquid crystal layer. In this way, it is possible to prevent unevenness in display attributable to a difference in a cell gap between a display region and the peripheral region.

4 Claims, 7 Drawing Sheets

LIQUID CRYSTAL DISPLAY DEVICE

CROSS REFERENCE TO RELATED APPLICATIONS

This application is based upon and claims the benefit of priority from Japanese Patent Application No. 2007-136812 filed on May 23, 2007; the entire contents of which are incorporated herein by reference.

BACKGROUND OF THE INVENTION

1. Field of the Invention

The present invention relates to a liquid crystal display device, and more specifically to a technique suitable for a liquid crystal display device formed by sticking substrates together in accordance with a one drop fill method.

2. Description of the Related Art

A liquid crystal display device has a structure in which liquid crystal is interposed between two glass substrates disposed to face each other and stuck together by using an adhesive. To achieve a uniform cell gap (a thickness of a liquid crystal layer), plastic beads having even grain sizes are dispersed between the substrates. In recent years, there is known a technique to maintain a uniform cell gap by forming protrusions (spacers) on a substrate. The spacers can be selectively arranged and also have high accuracy in height thereof. Recently, there has been disclosed a technique for eliminating unevenness between substrates caused by disposing spacers having the same height in a central part and a peripheral part, which have different lamination structures, of the substrates (see Japanese Patent No. 3388463, for example).

Meanwhile, techniques for sticking the substrates together include a vacuum injection method and a one drop fill method. According to the vacuum injection method, an adhesive is disposed on one of the substrates while forming a liquid crystal inlet therein. After the two substrates are assembled together, a cell gap is formed by crushing the adhesive while evacuating air between the substrates from the liquid crystal inlet with a load applied onto a substrate surface, or with a vacuum state established.

On the other hand, according to the one drip fill method, a given amount of liquid crystal is dropped into a region surrounded by an adhesive disposed on one of the substrates and the two substrates are assembled together in a vacuum state. Thereafter, an atmospheric pressure is recovered so that the adhesive is crushed by a difference in pressure between the inside and the outside of the region surrounded by the two substrates and an inner wall of the adhesive. As a result, a predetermined cell gap is formed between the substrates.

In recent years, the one drop fill method is widely diffused because of its capabilities of shortening tact time, improving use efficiency of materials, achieving higher accuracy in the cell gap, and so forth (see Japanese Unexamined Patent Application Publication No. Hei 5-232481, for example).

However, in the conventional liquid crystal display device, degrees of irregularities are significantly different between a display region where electrode wiring, coloring layers of color filters, and the like are densely formed and a periphery (a peripheral region) of the display region. For this reason, if the spacers formed on the substrate have uniform heights, the spacers in the display region contact the opposed substrate but the spacers in the peripheral region do not contact the opposed substrate. Accordingly, there are a portion where the spacers function and a portion where the spacers do not function.

If the substrates are assembled together in this state, the cell gap in the peripheral region becomes thinner than the cell gap in the display region. Moreover, at a part of the display region located close to the peripheral region, one of the substrates is deformed and the cell gap becomes locally thicker. As a result, the cell gap at the part of display region located close to the peripheral region becomes different from the cell gap at a central part of the display region and such a difference is recognized as unevenness of display. Particularly, in the one drop fill method, the pressure is applied evenly to the substrate surface when the substrates are assembled together. Accordingly, this problem becomes more apparent when the spacers do not uniformly support the space between the substrates because the crushing manner of the adhesive is apt to be uneven.

Incidentally, the cell gap is influenced by an amount of injection of the liquid crystal. In the vacuum injection method configured to inject the liquid crystal from the inlet, the liquid crystal is hardly injected in excess of a volume inside a liquid crystal cell. Even if the liquid crystal is excessively injected, it is possible to squeeze the excessive portion out by adjusting the pressure. Accordingly, the vacuum injection method hardly causes an abnormal cell gap. On the contrary, in the one drop fill method, the liquid crystal is dropped on the closed region surrounded by the adhesive without the inlet and then the substrates are assembled together. Therefore, the cell gap becomes larger if the dropped amount of the liquid crystal is excessive. On the other hand, if the dropped amount of the liquid crystal is inadequate, the cell gap becomes smaller due to a shortage of the liquid crystal and bubbles may be generated. As described above, the one drop fill method has a problem of causing uneven cell gaps attributable to the unevenness in the amount of injection of the liquid crystal cell.

SUMMARY OF THE INVENTION

An object of the present invention is to provide a liquid crystal display device configured to prevent unevenness in display attributable to a difference in a cell gap between a display region and a peripheral region while tolerating unevenness in an amount of injection of liquid crystal.

A liquid crystal display device according to the present invention includes two substrates disposed to face each other. A liquid crystal layer is interposed in a clearance between the two substrates. A display region is provided on surfaces of the two substrates. A peripheral region is provided around the display region. In the peripheral region, the clearance between the substrates is gradually widened outward. A one drop fill method is used when injecting liquid crystal.

According to the present invention, the clearance between the substrates is gradually widened outward in the peripheral region. In this way, the cell gap is gently changed from the display region to the peripheral region. Accordingly, it is possible to prevent unevenness in display attributable to a difference in the cell gap between the display region and the peripheral region. Moreover, if the amount of injection of the liquid crystal is excessive, the excessive liquid crystal is filled in a zone of the peripheral region where the clearance is widened. As a result, it is possible to tolerate unevenness in the amount of injection of the liquid crystal.

DESCRIPTION OF THE EMBODIMENTS

First Embodiment

Figure 1:
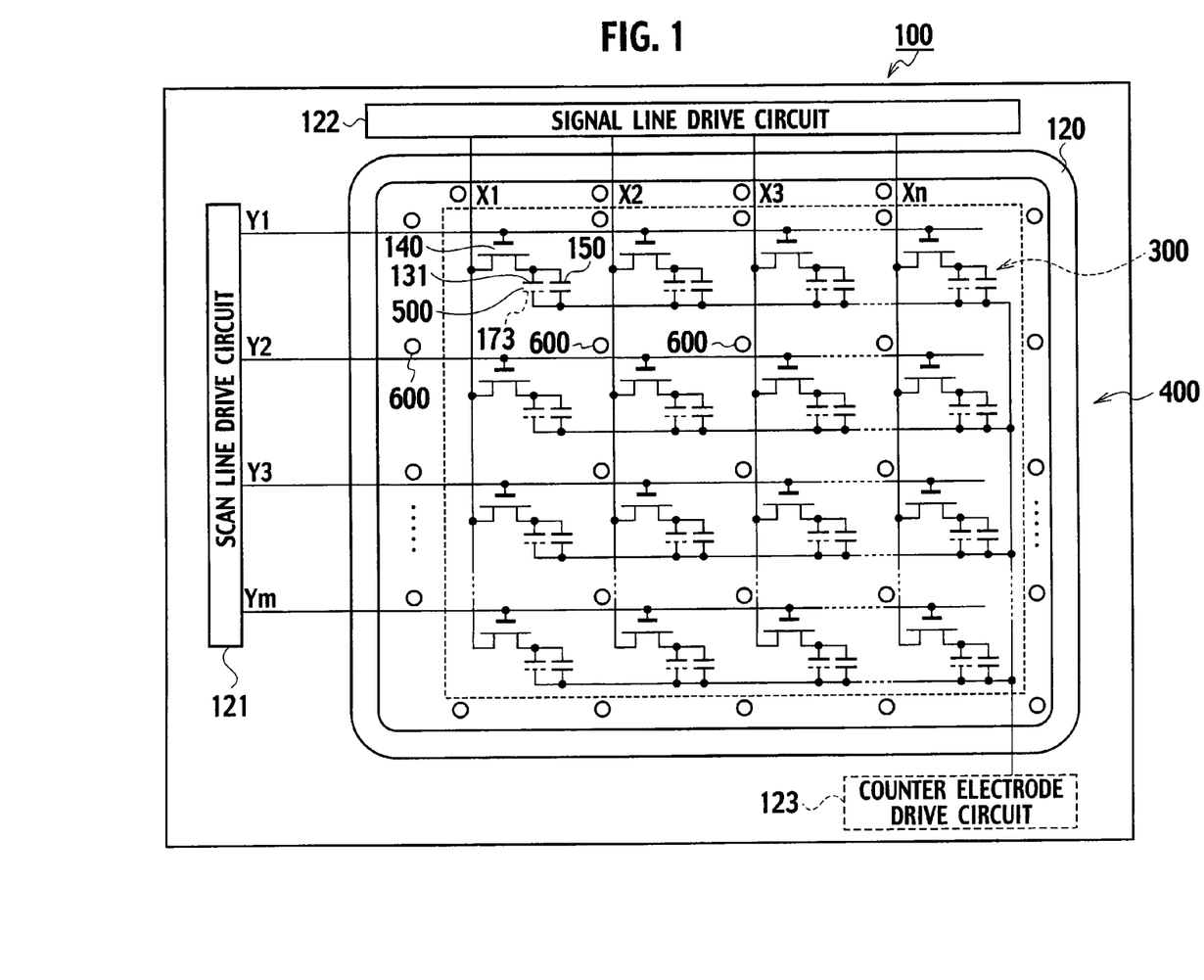
FIG. 1 is a plan view schematically showing a configuration of an array substrate of a liquid crystal display device according to a first embodiment of the present invention.

A plan view in FIG. 1 schematically shows a configuration of an array substrate of a liquid crystal display device according to a first embodiment of the present invention. A display region 300 indicated by a dotted line is provided on an array substrate 100. A peripheral region 400 is provided around the display region 300. In the peripheral region 400, an adhesive 120 is disposed seamlessly so as to surround the display region 300. When injecting liquid crystal, a predetermined amount of the liquid crystal is dropped into the region surrounded by the adhesive 120 in accordance with a one drop fill method. Thereafter, the array substrate 100 and another opposed substrate are assembled together.

On the array substrate 100, m pieces of scan lines Y1 to Ym (hereinafter collectively referred to as scan lines Y) and n pieces of signal lines X1 to Xn (hereinafter collectively referred to as signal lines X) are arranged orthogonally to one another. A pixel TFT (thin film transistor) 140, a transparent pixel electrode 131, and an auxiliary capacitor 150 are disposed on each intersection. A TFT applying amorphous silicon (a-Si) as a semiconductor layer is used for the pixel TFT 140. To be more precise, a drain terminal of the pixel TFT 140 is connected to the signal line X, a source terminal of the pixel TFT 140 is connected in parallel to the auxiliary capacitor 150 and the pixel electrode 131, and a gate terminal of the pixel TFT 140 is connected to the scan line Y. A counter electrode 173 is disposed opposite to all the pixel electrodes 131 while interposing a liquid crystal layer 500 therebetween.

A scan line drive circuit 121, a signal line drive circuit 122, and a counter electrode drive circuit 123 are disposed in the peripheral region 400. The scan line drive circuit 121 is connected to the scan lines Y and is configured to drive the respective scan lines sequentially. The signal line drive circuit 122 is connected to the signal lines X and is configured to supply video signals to the respective signal lines. The counter electrode drive circuit 123 is connected to the auxiliary capacitors 150 and the counter electrode 173 and is configured to supply predetermined electric potential.

Multiple spacers 600 are disposed in the display region 300 and the peripheral region 400. The spacers 600 are columnar protrusions having uniform heights, which are formed on the array substrate 100. In the display region 300, each of the spacers 600 is formed in the vicinity of each intersection of the signal line X and the scan line Y. In the peripheral region 400, each of the spacers 600 is formed in the vicinity of an intersection of the signal line X and the adhesive 120 or in the vicinity of an intersection of the scan line Y and the adhesive 120.

Next, a configuration of a counter substrate 200 facing the array substrate 100 will be described with reference to FIG. 2. As shown in a plan view of FIG. 2, in the display region 300, light-shielding layers 210 are linearly formed so as to correspond to the signal lines X. Color filters 211 are formed between the light-shielding layers 210. The color filters are repeatedly formed in the order of red (R), green (G), and blue (B). Meanwhile, a light-shielding layer 220 is formed into a frame shape so as to correspond to the peripheral region 400. In the peripheral region 400 on the counter substrate 200, structural objects 230 are formed in positions corresponding to the spacers 600 on the array substrate 100.

Figure 2:
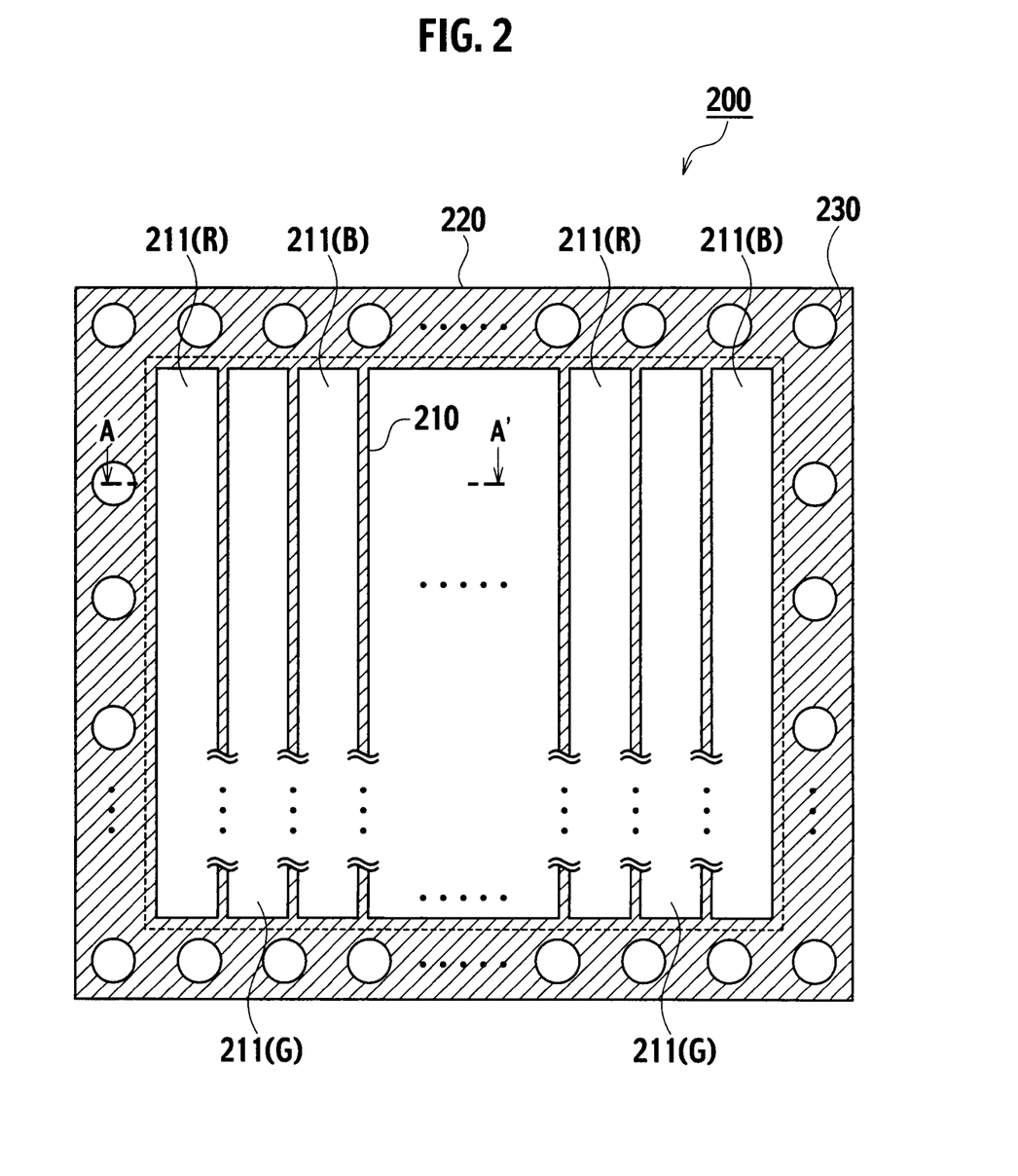
FIG. 2 is a plan view schematically showing a configuration of a counter substrate of the liquid crystal display device.
Figure 3:
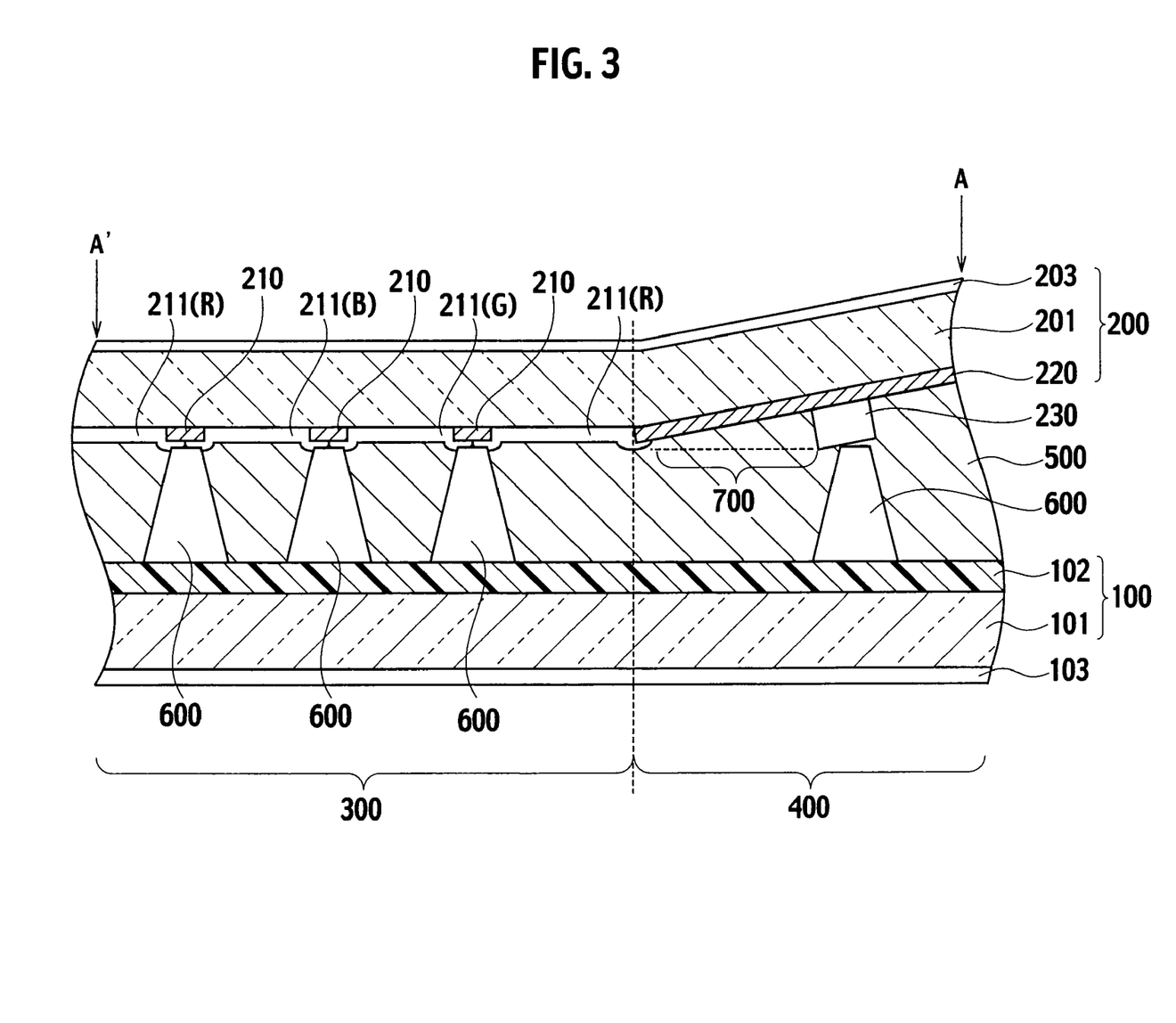
FIG. 3 is a cross-sectional view of the liquid crystal display device showing an A-A' section.

FIG. 3 shows a cross section of the liquid crystal display device corresponding to an A-A' section in FIG. 2. The liquid crystal display device includes the array substrate 100 and the counter substrate 200 disposed opposite to each other, and the liquid crystal layer 500 interposed in a clearance between the two substrates. In the peripheral region 400, a substrate surface of the counter substrate 200 is gently inclined in a direction away from the liquid crystal layer 500. Now, concrete configurations will be described.

In the array substrate 100, an insulating layer 102 is formed on a glass substrate 101. A polarizing plate 103 is disposed on a surface of the glass substrate 101 opposed with the liquid crystal layer 500. The columnar spacers 600 having the uniform heights are formed on the insulating layers 102 in both of the display region 300 and the peripheral region 400. Although illustration is omitted in FIG. 3, auxiliary capacitor lines to be connected to the pixel TFTs, the transparent electrodes or the like are formed on the insulating layer 102. Meanwhile, a backlight (not shown) for irradiating light on the display region 300 is disposed close to the polarizing plate 103 of the array substrate 100.

In the counter substrate 200, the light-shielding layers 210 are formed in the display region 300 on a glass substrate 201 so as to correspond to the signal lines X. The color filters 211 are formed between the light-shielding layers 210. The color filters 211 are partially overlapped with the light-shielding layers 210 in order to prevent light leakage or color mixture attributable to patterning accuracy. The light-shielding layer 220 is formed in the peripheral region 400 on the glass substrate 201. A polarizing plate 203 is disposed on a surface of the glass substrate 201 opposed with the liquid crystal layer 500. Moreover, although illustration is omitted in FIG. 3, an overcoat layer and the counter electrodes are laminated so as to cover the light-shielding layers 210 and 220 and the color filters 211.

The structural objects 230 are formed on the light-shielding layer 220 in the peripheral region 400 so as to be opposed to the spacers 600 on the array substrate 100. The same material as the material of the color filters 211 is used for the structural objects 230.

In the display region 300, the spacers 600 support both of the substrates. Meanwhile, in the peripheral region 400, the spacers 600 and the structural objects 230 support both of the substrates. As a result, the substrate surface of the glass substrate 201 is gently inclined in the direction away from the liquid crystal layer 500. In other words, in the peripheral region 400, the surface of glass substrate 201 inclines gently in the direction away from the glass substrate layer 101. That is, in the peripheral region 400, the clearance between the glass substrate 201 and the glass substrate 101 is gradually increased outward. For example, in the peripheral region 400, the glass substrate 201 is inclined relative to the display region at an angle of 10 degrees. In this way, the cell gap is gently increased from the display region 300 toward the peripheral region 400. Accordingly, the cell gap is not suddenly changed at a part of the display region 300 located close to the peripheral region 400. In this way, it is possible to prevent unevenness in display.

Moreover, in the peripheral region 400, the clearance between the glass substrate 201 and the glass substrate 101 is widened outward, thereby generating a new region (hereinafter referred to as a liquid crystal excess region 700) between these substrates.

In the one drop fill method, the adhesive 120 is coated in the peripheral region 400 of the substrate. After dropping the liquid crystal into the display region 300, the two substrates are assembled together in a vacuum. Thereafter, the substrates are attached and sealed together by recovering an atmospheric pressure. For this reason, a pressure is evenly applied to the two substrates by this atmospheric pressure and the spacers 600 located between the substrates are contracted. Accordingly, the excessive liquid crystal is apt to occur. However, since the excessive liquid crystal is filled into the liquid crystal excess region 700, it is possible to suppress variation in the cell gap and thereby to maintain the uniform cell gap in the display region 300. Hence, it is possible to prevent the unevenness in display. Moreover, it is also possible to tolerate unevenness in an amount of injection of the liquid crystal.

Therefore, according to this embodiment, by forming the substrate surface of the counter substrate 200 in the peripheral region 400 to be gently inclined in the direction away from the liquid crystal layer 500, it is possible to change the cell gap gently and largely from the display region 300 toward the peripheral region 400. As a consequence, it is possible to eliminate a sudden change in the cell gap at the part of the display region 300 located close to the peripheral region 400. Hence, it is possible to prevent the unevenness in display attributable to a difference in the cell gap between the display region 300 and the peripheral region 400. Moreover, when the amount of injection of the liquid crystal is excessive, the excessive liquid crystal is filled into the liquid crystal excess region 700. Accordingly, it is possible to suppress the variation in the cell gap and to tolerate the unevenness in the amount of injection of the liquid crystal.

Figure 5:
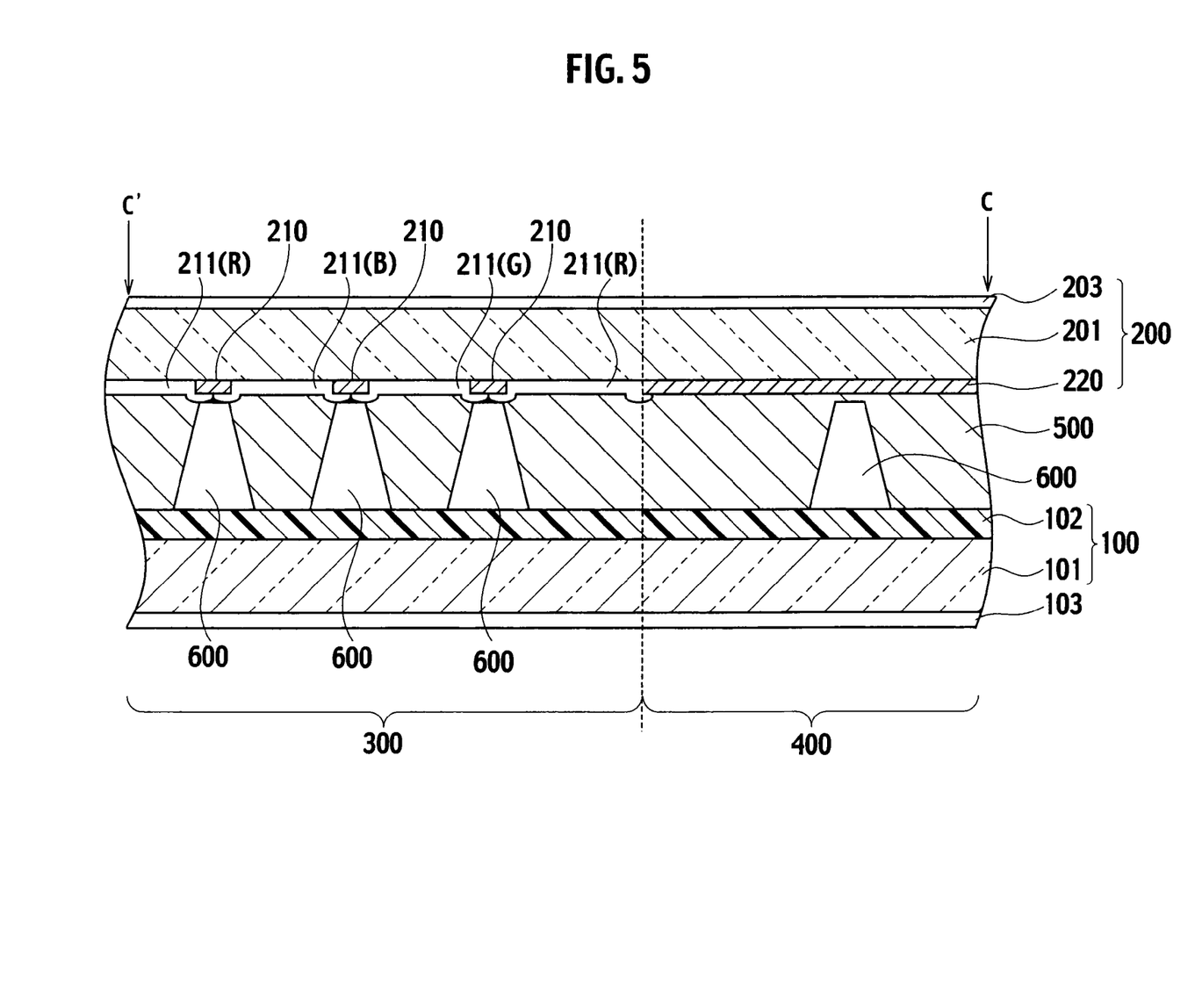
FIG. 5 is a cross-sectional view showing a configuration of a liquid crystal display device of a comparative example before sticking substrates together.

Next, a liquid crystal display device of a comparative example will be described in order to facilitate understandings of the above-described embodiment. FIG. 5 is a cross-sectional view of the liquid crystal display device of the comparative example. Basic configurations of the liquid crystal display device of the comparative example are similar to those explained in the first embodiment. A difference from the first embodiment is in that the substrate surface of the counter substrate 200 is not inclined before sticking the substrates together as shown in FIG. 5. The color filters 211, the light-shielding layers 210, the transparent electrodes, and the like are densely formed in the display region 300 on the counter substrate 200. Accordingly, degrees of irregularities are significantly different in comparison with the peripheral region 400. In the display region 300, the spacers 600 come in contact with the counter substrate 200, but in the peripheral region 400, the spacers 600 do not come in contact with the counter substrate 200. For this reason, a portion supporting the substrates and a portion not supporting the substrates are caused by laminated structures on the counter substrate 200.

Figure 6:
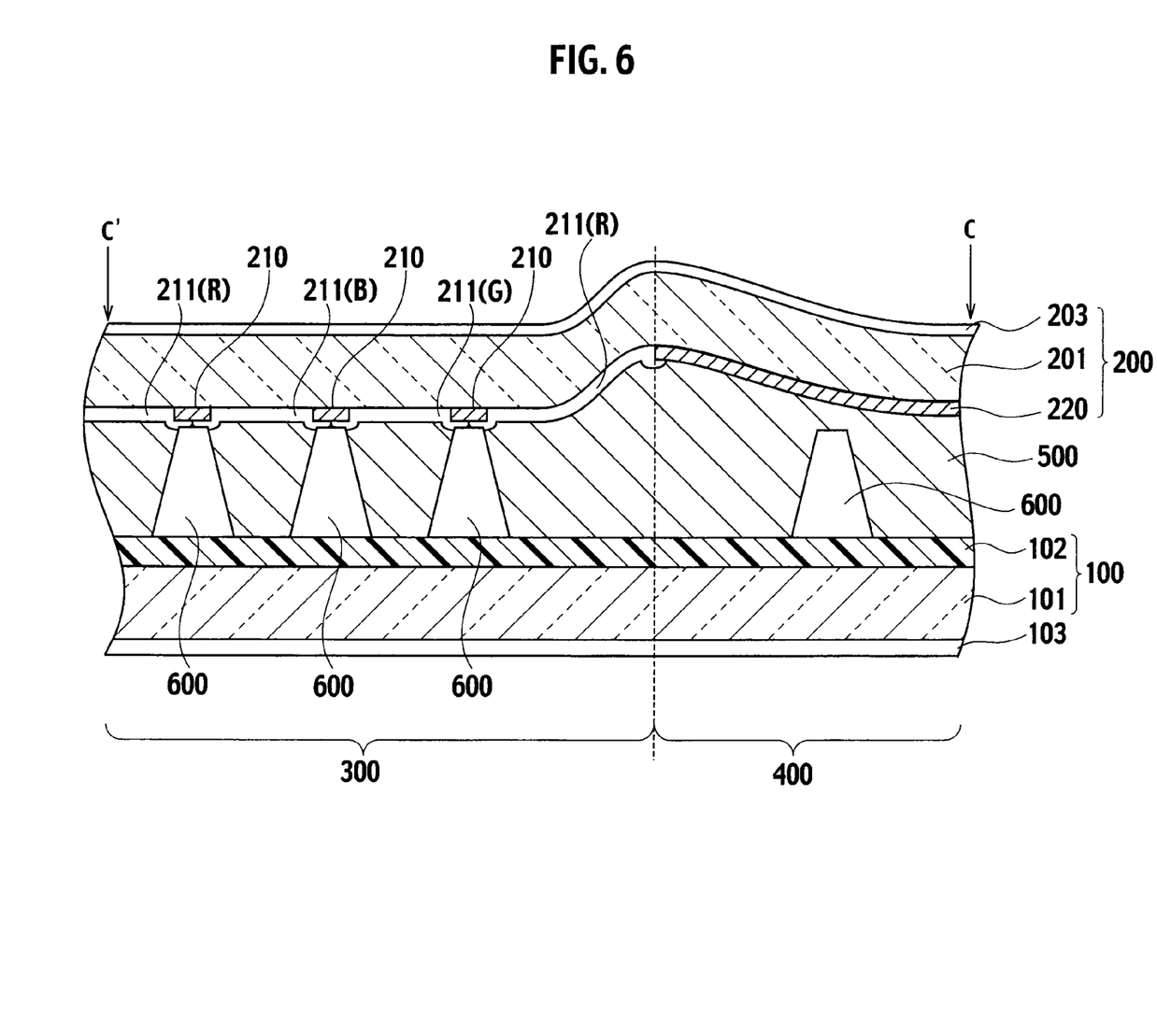
FIG. 6 is a cross-sectional view showing the configuration of the liquid crystal display device of the comparative example after sticking the substrates together.

As shown in a cross-sectional view in FIG. 6, the cell gap in the peripheral region 400 becomes thinner than the cell gap in the display region 300 after sticking the substrates together. Moreover, at the part of the display region 300 located close to the peripheral region 400, one of the substrates causes rebound so that the cell gap partially becomes thicker. As a result, the cell gap at the part of the display region 300 located close to the peripheral region 400 becomes different from the cell gap at a central part of the display region 300. Such a difference is recognized as unevenness of display. Particularly, in the one drop fill method, the pressure is applied evenly to the substrate surface in sticking the substrates together so that this problem becomes more apparent when the spacers do not uniformly support the space between the substrates because the crushing manner of the adhesive is apt to be uneven.

In this embodiment, the clearance between the substrates is gently increased outward by supporting the substrates by use of the spacers 600 and the structural objects 230 in the peripheral region 400. In this way, the cell gap at the part of the display region 300 located close to the peripheral region 400 is not suddenly changed even when the substrates are stuck together in accordance with the one drop fill method.

Figure 7:
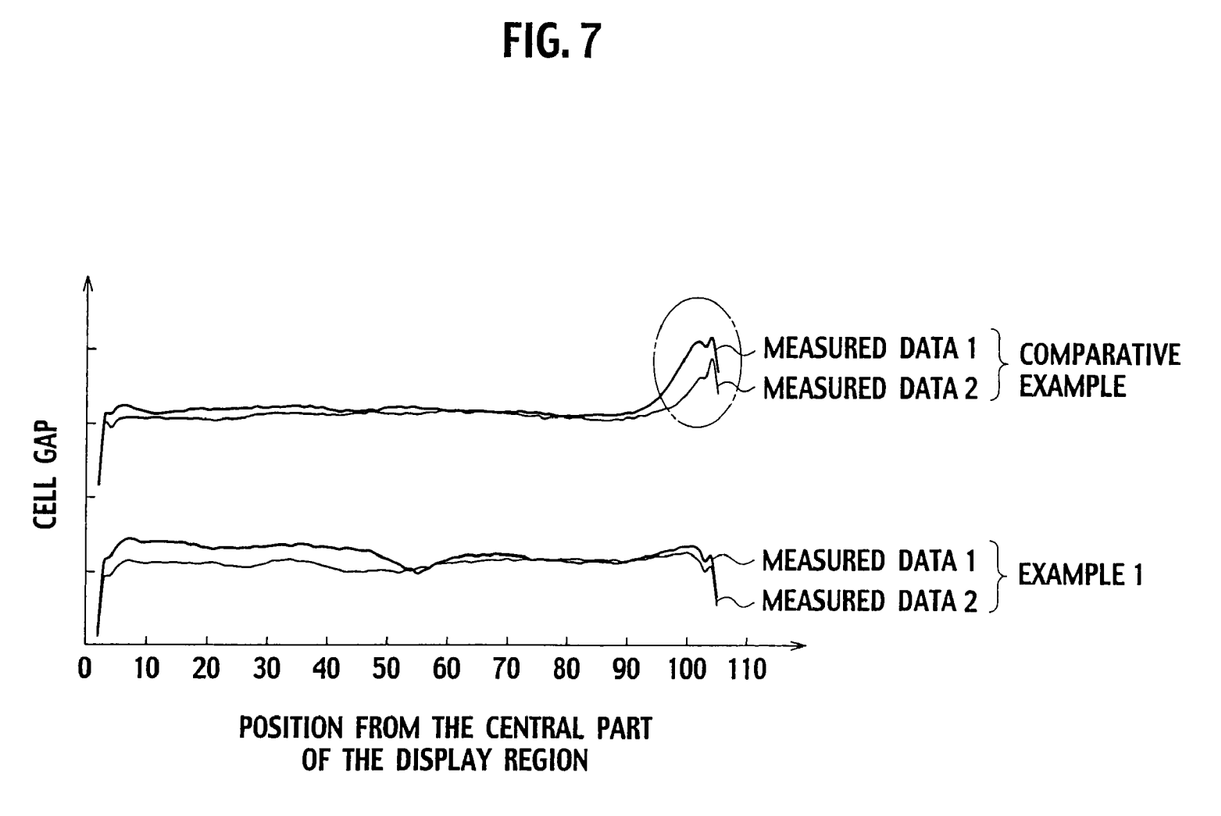
FIG. 7 is a chart showing cell gaps in display regions of the liquid crystal display devices of the embodiment and the comparative example.

A chart in FIG. 7 briefly shows the cell gaps measured in the display regions of respectively the liquid crystal display device according to the first embodiment (which is indicated as "Example 1" in the chart) and the liquid crystal display device according to the comparative example (which is indicated as "Comparative Example" in the chart). Numerical values on the lateral axis in FIG. 7 indicate standardized values of positions ranging from the central part to an end part of the display region. Here, the value 0 corresponds to the coordinate at the central part while the value 110 corresponds to the coordinate at the end part. Results of two sessions of the measurement are shown herein.

In "Comparative Example" shown in FIG. 7, the cell gap at the end of the display region 300 is largely rebounded. This aspect indicates that the spacers 600 in the peripheral region 400 fail to support the counter substrate 200 and are crushed instead. On the contrary, in "Example 1" shown in FIG. 7, the cell gap seems substantially uniform. In this way, it is apparent that the cell gap is not suddenly changed at the part of the display region located close to the peripheral region when sticking the substrates together. Moreover, unevenness in display does not occur in the display region of "Example 1".

In addition, in the liquid crystal display device of the comparative example, the cell gap is increased when the amount of injection of the liquid crystal is excessive in the course of the one drop fill method whereas the cell gap becomes smaller due to a shortage of the liquid crystal and bubbles may be generated. As described above, the comparative example has a risk of causing uneven cell gaps attributable to the unevenness in the amount of injection of the liquid crystal. On the contrary, according to this embodiment, the excessive liquid crystal is filled into the liquid crystal excess region 700 in the peripheral region 400 if the amount of injection of the liquid crystal is excessive. Therefore, it is possible to tolerate the unevenness in the amount of injection of the liquid crystal. Moreover, since it is possible to absorb a local impact on the substrate surface in the display region, and resistance to compressive deformation in the event of occurrence of low-temperature bubbles or application of a pressure onto the surface of the display region with a finger is improved.

Second Embodiment

Next, a liquid crystal display device according to a second embodiment of the present invention will be described. Basic configurations of this liquid crystal display device are similar to those explained in the first embodiment. Accordingly, a difference from the first embodiment will be mainly described below.

Figure 4:
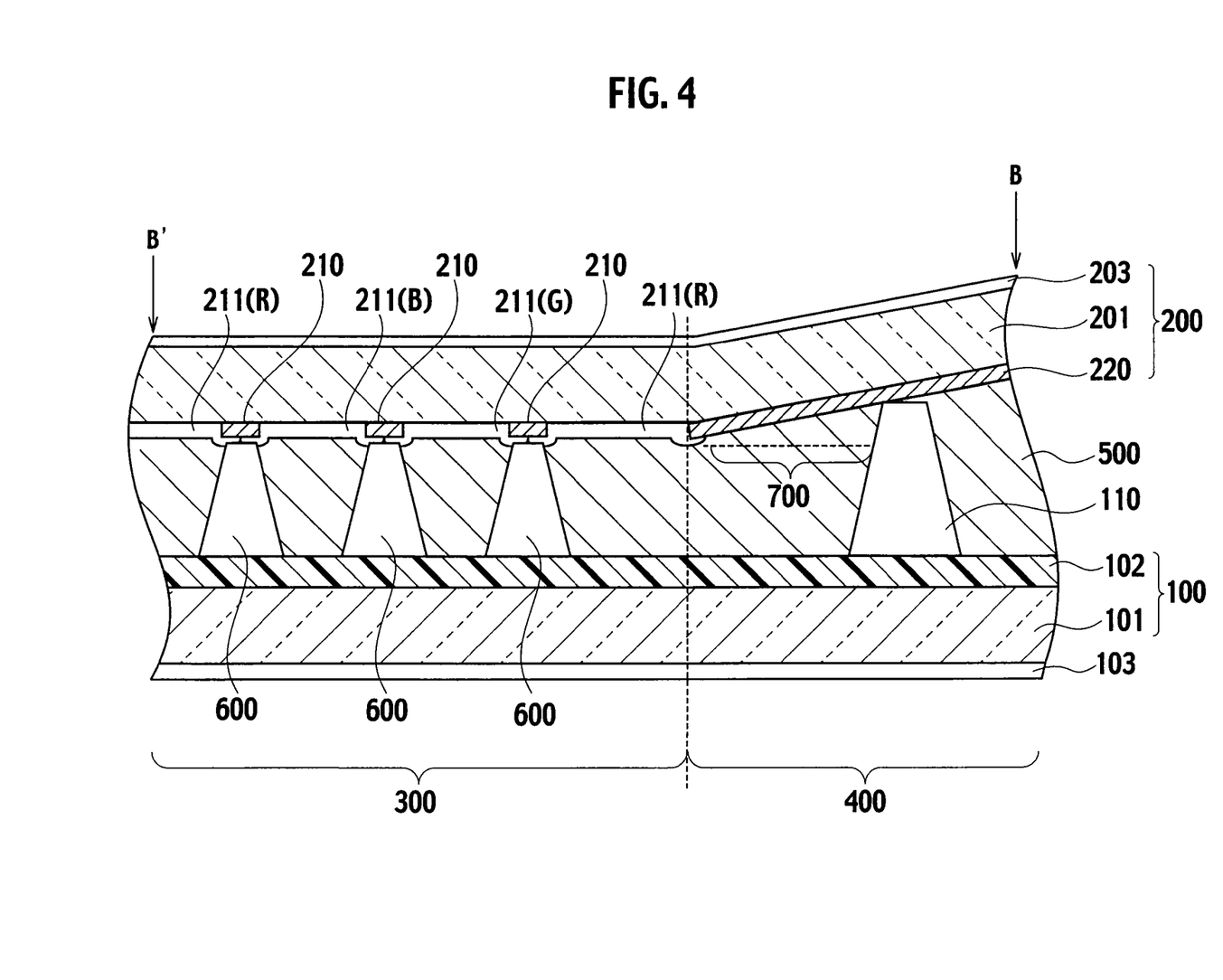
FIG. 4 is a cross-sectional view showing a configuration of a liquid crystal display device according to a second embodiment of the present invention.

As shown in FIG. 4, a difference of this embodiment from the first embodiment is in that structural objects 110 which are higher than the spacers 600 are disposed in the peripheral region 400. The structural objects 110 are disposed on the array substrate 100. The structural objects 110 are made of the same material as the material of the spacers. In this configuration, both of the substrates are supported by the spacers 600 in the display region 300, while the substrates are supported by the structural objects 110 in the peripheral region 400. In this way, the substrate surface of the counter substrate 200 in the peripheral region 400 is gently inclined in the direction away from the liquid crystal layer 500 in this embodiment.

Therefore, according to this embodiment, it is possible to incline the substrate surface of the counter substrate 200 in the peripheral region 400 gently in the direction away from the liquid crystal layer 500 by disposing the structural objects 110 higher than the spacers 600. Hence, this embodiment can exert a similar effect to the first embodiment.

Although the structural objects 110 higher than the spacers 600 are disposed on the array substrate in the second embodiment, the present invention is not limited to this configuration. For example, it is also possible to dispose the structural objects 110 on the counter substrate 200 so as to incline the counter substrate 200.

Meanwhile, the structural objects 110 in the second embodiment are made of the same material as the spacers. However, the present invention is not limited to this configuration. For example, it is also possible to use a reinforced adhesive, which is prepared by adding a hardening agent to the adhesive, as the structural objects 110 and thereby to support the substrates.

Normally, the peripheral region is the region which does not contribute to a displaying function. Accordingly, it is possible to minimize adverse effects on product appearance and other design factors by locating the peripheral region into a casing of an information device for embedding the liquid crystal device.

What is claimed is:

1. A liquid crystal display device comprising:
   two substrates disposed to face each other;
   a display region provided on surfaces of the two substrates;
   a peripheral region provided around the display region in which a portion of one of said two substrates inclines in a direction away from another substrate, and a portion of the other one of said two substrates does not incline in a direction away from another substrate;
   an adhesive seamlessly disposed in a clearance in a position corresponding to the peripheral region so as to surround the display region;
   a liquid crystal layer interposed in a clearance between the two substrates through one drop fill method, said liquid crystal layer including a portion that is gradually widened outward;
   a first spacer disposed on any one of the two substrates in the display region;
   a second spacer disposed on the same substrate as the first spacer in the peripheral region and having the same height as the first spacer; and
   a structural object provided on another one of the two substrates in a position opposed to the second spacer, the structural object is a color filter formed on a light-shielding layer in the peripheral region.

2. The liquid crystal display device according to claim 1, wherein one of the two substrates inclines relative to the display region at an angle of 10 degrees in the peripheral region.

3. The liquid crystal display device according to claim 1, wherein a pressure is applied evenly to the substrate surface in sticking the substrates together.

4. A liquid crystal display device comprising;
   an array substrate;
   a counter substrate facing the array substrate;
   a display region provided on surface of the two substrates;
   a peripheral region provided around the display region in which a portion of the counter substrate inclines in a direction away from the array substrate, and a portion of the array substrate does not incline in a direction away from the counter substrate;
   an adhesive seamlessly disposed in a clearance in a position corresponding to the peripheral region so as to surround the display region;
   a liquid crystal layer interposed in a clearance between the array substrate and the counter substrate through one drop fill method, the liquid crystal layer including a portion that is gradually widened outward;
   a first spacer disposed on the array substrate in the display region;
   a second spacer disposed on the array substrate in the peripheral region and having the same height as the first spacer;
   a light-shielding layer formed into a frame shape on the counter substrate so as to correspond to the peripheral region; and
   a structural object provided on the counter substrate in a position opposed to the second spacer so as to incline the counter substrate, the structural object comprising a color filter formed on the light-shielding layer in the peripheral region.

* * * * *